(12) United States Patent
Miller

(10) Patent No.: US 8,696,994 B2
(45) Date of Patent: Apr. 15, 2014

(54) SYSTEM FOR PRODUCING TRANSPORTATION FUELS FROM WASTE PLASTIC AND BIOMASS

(75) Inventor: Stephen Joseph Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 670 days.

(21) Appl. No.: 12/900,328

(22) Filed: Oct. 7, 2010

(65) Prior Publication Data

US 2011/0020190 A1   Jan. 27, 2011

Related U.S. Application Data

(62) Division of application No. 11/955,130, filed on Dec. 12, 2007, now Pat. No. 7,834,226.

(51) Int. Cl.
  *G05D 7/00* (2006.01)
  *B01J 4/00* (2006.01)
  *B01J 8/00* (2006.01)
  *C10G 1/00* (2006.01)

(52) U.S. Cl.
  USPC ........... 422/110; 422/608; 422/610; 422/630; 422/634; 585/240

(58) Field of Classification Search
  USPC ........... 422/110, 608, 610, 630, 634; 585/240
  See application file for complete search history.

(56) References Cited

U.S. PATENT DOCUMENTS

| | | | |
|---|---|---|---|
| 3,257,363 A * | 6/1966 | Miller et al. ............. 526/59 |
| 4,642,401 A | 2/1987 | Coenen et al. |
| 4,859,312 A | 8/1989 | Miller |
| 4,992,605 A | 2/1991 | Craig et al. |
| 5,158,665 A | 10/1992 | Miller |
| 5,300,210 A | 4/1994 | Zones et al. |
| 6,084,139 A | 7/2000 | Van Der Giessen et al. |
| 6,150,577 A | 11/2000 | Miller et al. |
| 6,204,426 B1 | 3/2001 | Miller et al. |
| 6,630,066 B2 | 10/2003 | Cash et al. |
| 6,723,889 B2 | 4/2004 | Miller et al. |
| 6,774,272 B2 * | 8/2004 | Miller ................. 585/241 |
| 6,822,126 B2 | 11/2004 | Miller |
| 6,841,063 B2 | 1/2005 | Elomari |
| 6,846,402 B2 | 1/2005 | Hemighaus et al. |
| 2004/0181109 A1 * | 9/2004 | Miller et al. ............. 585/739 |
| 2006/0161032 A1 | 7/2006 | Murzin et al. |
| 2007/0170091 A1 | 7/2007 | Monnier et al. |
| 2009/0031615 A1 | 2/2009 | Joshi et al. |

OTHER PUBLICATIONS

Rana et al., "A Review of Recent Advances on Process Technologies for Upgrading of Heavy Oils and Residua," Fuel, vol. 86, pp. 1216-1231 (2007).

* cited by examiner

*Primary Examiner* — Lessanework Seifu
(74) *Attorney, Agent, or Firm* — Tiffany E. Weksberg

(57) ABSTRACT

The present invention is generally directed to methods and systems for producing biofuels via biomass, waste plastic, and/or Fischer-Tropsch product feeds. Such methods and systems are an improvement over the existing art at least in that they are feed-tolerant (i.e., allow for variability) and provide an economy of scale, while typically retaining the environmental benefits associated with such processing of such feeds.

8 Claims, 2 Drawing Sheets

US 8,696,994 B2

SYSTEM FOR PRODUCING TRANSPORTATION FUELS FROM WASTE PLASTIC AND BIOMASS

CROSS-REFERENCE TO RELATED APPLICATIONS

This Application is a Divisional of U.S. patent application Ser. No. 11/955,130, filed Dec. 12, 2007.

FIELD OF THE INVENTION

This invention relates generally to methods and systems for processing waste plastic and biomass into usable products, and specifically to methods and systems for pyrolyzing waste plastic and biomass feeds in a common pyrolysis unit en route to the production of transportation fuels.

BACKGROUND

1. Waste Plastic

There is a steadily increasing demand for technology capable of converting discarded and waste plastic materials into useful products. This is due in large measure to public concerns over potential environmental damage caused by the presence of these waste materials. According to a recent report from the Office of Solid Waste, about 62% of plastic packaging in the United States is made of polyethylene, the preferred feed for processing waste plastics. Plastics waste is the fastest growing waste product, with about 18 million tons per year in 1995 compared to only four million tons per year in 1970, and this amount is growing by approximately 10% per year. Transforming plastic waste material and particularly polyethylene into useful products presents a unique opportunity to address a growing environmental problem.

Methods for converting such above-mentioned waste plastic into lubricating oils have been described previously. See, e.g., U.S. Pat. Nos. 6,150,577 (Miller et al.) and 6,822,126 (Miller), both of which pertain to the production of high viscosity index (VI) lubricating oils from a primarily polyolefin waste plastic feedstock.

2. Biofuels

Many methods have been suggested for utilizing biofuels for energy production in order to compensate for at least a portion of the fossil fuel currently used in such energy production, and thereby also decrease net $CO_2$ emissions in the overall energy production cycle. Unfortunately, biofeedstocks are generally considered to be low energy fuels, and not easily utilized for energy production. The low energy content of biomass renders it generally inadequate for high-efficiency production of energy, such as high-temperature, high-pressure steam or electricity. Additionally, non-uniformity in the raw material (i.e., biomass), differences in its quality, and other similar hard-to-control variations, may cause problems in an energy production cycle that relies heavily on such fuel.

In view of the foregoing, methods and/or systems for integrating biofuel processing with waste plastic processing would be extremely useful—particularly wherein such processing provides for biofuel products, and wherein such processing can serve to ameliorate or mitigate at least some of the limitations typically associated with the processing of biomass.

BRIEF DESCRIPTION OF THE INVENTION

The present invention is generally directed to methods and systems for producing biofuels via a combination of biomass, waste plastic, and/or Fischer-Tropsch product feeds. Such methods and systems are an improvement over the existing art at least in that they are feed-tolerant (i.e., allow for variability) and provide an economy of scale, while typically retaining the environmental benefits generally associated with the processing of such feeds.

In some embodiments, the present invention is directed to one or more methods comprising the steps of: (a) pyrolyzing biomass concurrently with a second material such as waste plastic and/or Fischer-Tropsch wax, so as to yield pyrolysis oil; (b) separating the pyrolysis oil into at least two component fractions according to boiling range; (c) hydrotreating at least one of the at least two component fractions so as to yield at least one hydrotreated intermediate; and (d) catalytically-isomerizing the at least one hydrotreated intermediate so as to yield at least one isomerized product.

In some or other embodiments, the present invention is directed to one or more systems comprising: (a) a pyrolysis unit; (b) at least two feeds in communication with said pyrolysis unit, said at least two feeds comprising (i) a biomass feed, and (ii) at least one of a waste plastic feed and a Fischer-Tropsch waxy feed, wherein the at least two feeds can be channeled into the pyrolysis unit sequentially or simultaneously so as to produce pyrolysis oil, and wherein each feed can be varied so as to modulate the properties of the pyrolysis oil so produced; (c) a separation unit for separating the pyrolysis oil into at least two pyrolyzed component fractions according to their boiling range; (d) a hydrotreating unit for hydrotreating at least one of the pyrolyzed component fractions so as to yield one or more hydrotreated fractions; and (e) an isomerization unit for catalytically-isomerizing at least one of the hydrotreated fractions so as to yield at least one isomerized product.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
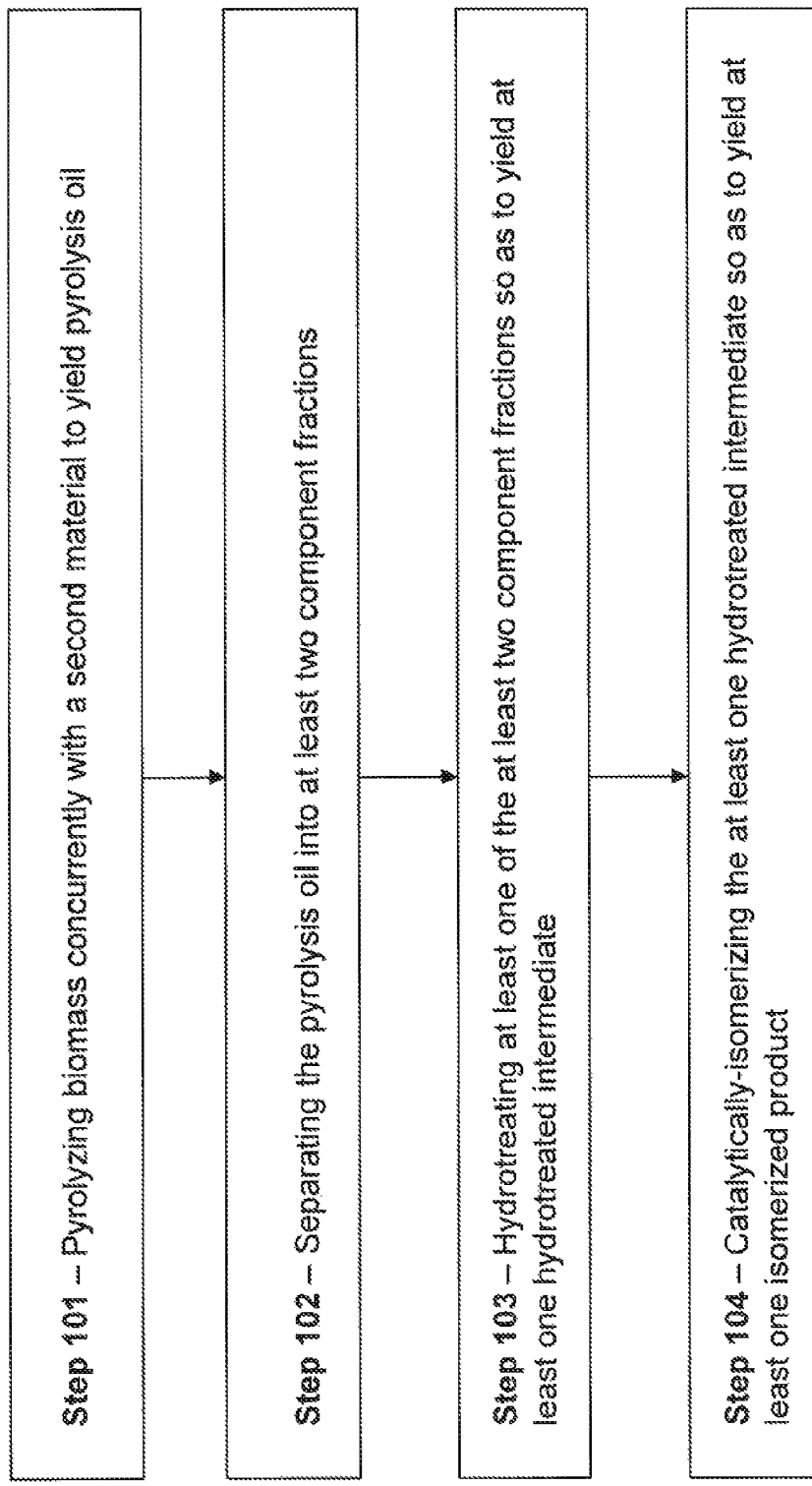
FIG. 1 depicts, in flow diagram form, a method for concurrently processing biomass with at least one other feed, in accordance with some embodiments of the present invention.

As mentioned above, the present invention is generally directed to methods and systems for producing biofuels via pyrolysis of biomass, waste plastic, and/or Fischer-Tropsch (FT) product feeds/feedstocks. Such method embodiments generally involve the simultaneous pyrolysis of biomass with waste plastic and/or a FT wax. Such system embodiments typically involve combining a biomass feed with a waste plastic and/or F-T waxy feed, and regulating the relative amount of each feed being directed into a pyrolysis unit for the production of a pyrolysis oil (py oil) that is subjectable to further processing. Such further processing can include hydroprocessing and/or isomerization and can yield, depending on conditions and feeds, a variety of biofuel products.

1. Definitions

Certain terms are defined throughout this description as they are first used, while certain other terms used in this description are defined below:

"Biofuel," as defined herein, is a fuel product at least partly derived from "biomass," the latter being a renewable resource of biological origin.

A "feedstock," as used herein, refers to hydrocarbonaceous material fed into one or more of the systems or processes of the present invention in order to make a fuel, lubricant, or other commercial product.

A "feed," as defined herein, is a feedstock-carrying conduit, typically being feedstock specific (i.e., dedicated to a specific feedstock).

A "gasifier," as defined herein, refers to a reaction environment wherein condensed hydrocarbonaceous feedstock material is converted into a gas through the action of heat and, possibly, one or more reactive gases such as oxygen, air, carbon dioxide ($CO_2$), and/or steam.

"Synthesis gas," or "syngas," as defined herein, generally refers to a mixture of carbon monoxide (CO) and hydrogen ($H_2$) produced by gasification in a gasifier.

As mentioned above, syngas can be catalytically-converted to paraffins (alkanes) via a catalytic Fischer-Tropsch (FT) process:

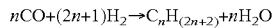
$$nCO+(2n+1)H_2 \rightarrow C_nH_{(2n+2)}+nH_2O$$

where typical catalysts include iron and cobalt. Examples of the Fisher-Tropsch process are described in U.S. Pat. No. 6,846,402.

"Pyrolyzing," as defined herein, refers to a thermal processing and/or thermal decomposition of hydrocarbonaceous material, wherein said decomposition is typically carried out in a non-oxidative environment.

"Pyrolysis oil," as defined herein, refers to a liquid hydrocarbon product resulting from the pyrolyzing treatment of hydrocarbonaceous material.

"Hydroprocessing" or "hydrotreating" refers to processes or treatments that react a hydrocarbon-based material with hydrogen, typically under pressure and with a catalyst (hydroprocessing can be non-catalytic). Such processes include, but are not limited to, hydrodeoxygenation (of oxygenated species), hydrotreating, hydrocracking, hydroisomerization, and hydrodewaxing. For examples of such processes, see Cash et al., U.S. Pat. No. 6,630,066; and Elomari, U.S. Pat. No. 6,841,063. Embodiments of the present invention utilize such hydroprocessing to convert triglycerides to paraffins. The terms "hydroprocessing" and "hydrotreating" are used interchangeably herein.

"Isomerizing," as defined herein, refers to catalytic processes that typically convert n-alkanes to branched isomers. ISODEWAXING (Trademark of CHEVRON U.S.A. INC.) catalysts are representative catalysts used in such processes. See, e.g., Zones et al., U.S. Pat. No. 5,300,210; Miller, U.S. Pat. No. 5,158,665; and Miller, U.S. Pat. No. 4,859,312.

"Transportation fuels," as defined herein, refer to hydrocarbon-based fuels suitable for consumption by vehicles. Such fuels include, but are not limited to, diesel, gasoline, jet fuel and the like.

"Diesel fuel," as defined herein, is a material suitable for use in diesel engines and conforming to the current version at least one of the following specifications: ASTM D 975—"Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

2. Methods

Referring to the flow diagram in FIG. 1, in some embodiments, the present invention is directed to one or more methods or processes comprising the steps of: (Step 101) pyrolyzing biomass concurrently with a second material selected from the group consisting of waste plastic, Fischer-Tropsch wax, and combinations thereof, so as to yield pyrolysis oil; (Step 102) separating the pyrolysis oil into at least two component fractions according to boiling range; (Step 103) hydrotreating at least one of the at least two component fractions so as to yield at least one hydrotreated intermediate; and (Step 104) catalytically-isomerizing the at least one hydrotreated intermediate so as to yield at least one isomerized product.

In some such above-mentioned method embodiments, the pyrolyzing is carried out by contacting a biomass feedstock and a second material feedstock in a pyrolysis zone at pyrolysis conditions, where at least a portion of the feed(s) is cracked, thus forming a pyrolysis zone effluent comprising 1-olefins and n-paraffins. Pyrolysis conditions include a temperature of from about 400° C. to about 700° C., preferably from about 450° C. to about 650° C. Conventional pyrolysis technology teaches operating conditions of above-atmospheric pressures. See, e.g., U.S. Pat. No. 4,642,401. Additionally, it has been discovered that by adjusting the pressure downward, the yield of a desired product can be controlled. See, e.g., U.S. Pat. No. 6,150,577. Accordingly, in some embodiments where such control is desired, the pyrolysis pressure is sub-atmospheric.

In some such above-mentioned method embodiments, the biomass comprises material selected from the group consisting of cellulosic biomass, triglyceride-containing biological oils, lignin, hemicellulose, starch, and combinations thereof. Those of skill in the art will recognize that, depending on the desired products and processing conditions, and also on economic factors, some types of biomass will be more preferred than others. Those of skill in the art will further recognize that there will be variability in the upper limits of the percent biomass in the overall feed—depending on the nature of the feed and the product(s) desired.

In some such above-mentioned method embodiments, the second material is waste plastic, wherein said waste plastic comprises at least about 75 wt. % polyolefins, preferably at least about 80 wt. % polyolefins, and more preferably at least about 90 wt. % polyolefins.

In such embodiments where a Fischer-Tropsch waxy feedstock is employed, the FT wax is typically characterized as a product comprising paraffins and alpha (α) olefins having 30 or more carbon atoms each.

An advantage of at least some of the above-mentioned method embodiments resides in that the relative amounts of biomass and second material being concurrently pyrolyzed can be varied. Such variability can be effected "on-the-fly," so as to continue to produce uniform product from varying feed, thereby increasing processing efficiency.

In some such above-described method embodiments, the step of separating employs a distillation technique. Such distillation techniques are well-known to those of skill in the art, particularly refining. Briefly, such techniques serve to separate a mixture into "fractions" or "cuts" based upon their boiling range. When temperatures required to separate particular fractions become too high, cracking and other decomposition processes can ensue. In some such circumstances, vacuum flashing can be employed to effect such separations.

A common cut point for such distilling operations is 650° F., the temperature separating light gas oil or diesel from heavy gas oil. Accordingly, in some such above-mentioned method embodiments, the at least two component fractions comprise a 650° F.− fraction (boiling below 650° F.) and a 650° F.+ fraction (boiling above 650° F.).

In some such above-described method embodiments, the step of hydrotreating involves a hydroprocessing/hydrotreating catalyst and a hydrogen-containing environment. In some such embodiments, the active hydrotreating catalyst component is a metal or alloy selected from the group consisting of cobalt-molybdenum (Co—Mo) catalyst, nickel-molybdenum (Ni—Mo) catalyst, noble metal catalyst, and combinations thereof. Such species are typically supported on a refractory oxide support. Hydrotreating conditions generally include temperature in the range 350° C.-450° C. and pressure in the range of about 4.8 MPa to about 15.2 MPa. For a general review of hydroprocessing/hydrotreating, see, e.g., Rana et al., "A Review of Recent Advances on Process Technologies for Upgrading of Heavy Oils and Residua," Fuel, vol. 86, pp. 1216-1231, 2007. For an example of how triglycerides can be hydroprocessed to yield a paraffinic product, see Craig et al., U.S. Pat. No. 4,992,605.

In some such above-described embodiments, the step of catalytically-isomerizing results in superior fuel properties relative to those of the non-isomerized product. In some such embodiments, the step of isomerizing is carried out using an isomerization catalyst. Suitable such isomerization catalysts can include, but are not limited to Pt or Pd on a support such as, but further not limited to, SAPO-11, SM-3, SSZ-32, ZSM-23, ZSM-22; and similar such supports. In some or other embodiments, the step of isomerizing comprises use of a Pt or Pd catalyst supported on an acidic support material selected from the group consisting of beta or zeolite Y molecular sieves, $SiO_2$, $Al_2O_3$, $SiO2-Al_2O_3$, and combinations thereof. In some such embodiments, the isomerization is carried out at a temperature between about 500° F. and about 750° F. The operating pressure is typically 200 to 2000 pounds-force per square inch gauge (psig), and more typically 200 psig to 1000 psig. Hydrogen flow rate is typically 50 to 5000 standard cubic feet/barrel (SCF/barrel). For other suitable isomerization catalysts, see, e.g., Zones et al., U.S. Pat. No. 5,300,210; Miller, U.S. Pat. No. 5,158,665; and Miller, U.S. Pat. No. 4,859,312.

With regard to the catalytically-driven isomerizing step described above, in some embodiments, the methods described herein may be conducted by contacting the n-paraffinic product with a fixed stationary bed of catalyst, with a fixed fluidized bed, or with a transport bed. In one presently contemplated embodiment, a trickle-bed operation is employed, wherein such feed is allowed to trickle through a stationary fixed bed, typically in the presence of hydrogen. For an illustration of the operation of such catalysts, see Miller et al., U.S. Pat. Nos. 6,204,426 and 6,723,889.

In some such above-mentioned method embodiments, the at least one isomerized product yielded in the step of catalytically-isomerizing is a transportation biofuels, of which biodiesel is representative.

3. Systems

Figure 2:
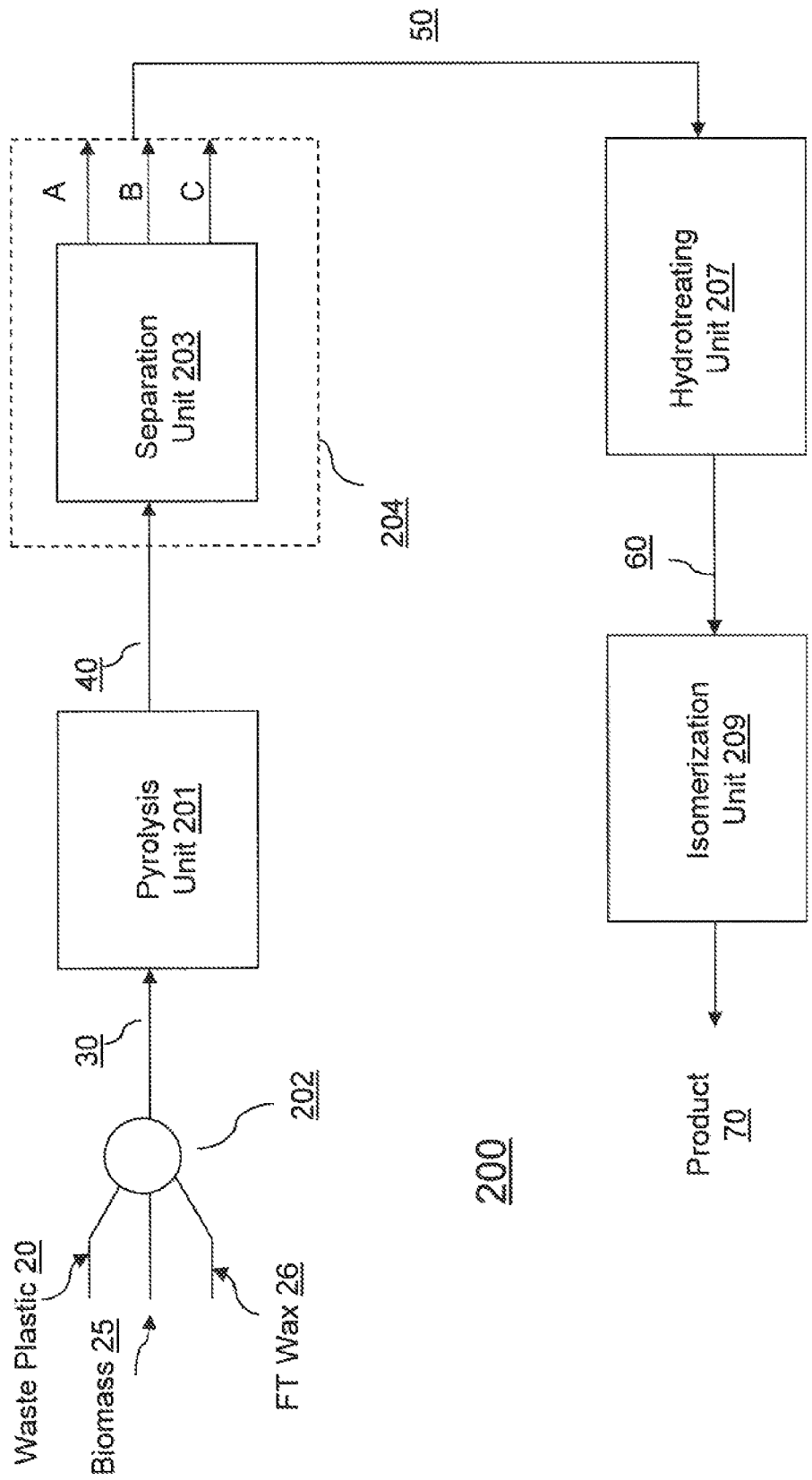
FIG. 2 is a schematic illustrating a system for producing fuel products from a multiplicity of feeds, in accordance with some embodiments of the present invention.

Referring to FIG. 2, in some embodiments, the present invention is directed to one or more systems, such as system 200, said system comprising: a pyrolysis unit 201; at least two feeds in communication with said pyrolysis unit 201, said at least two feeds comprising (i) a biomass feed 25, and (ii) at least one of a waste plastic feed 20 and a Fischer-Tropsch waxy feed 26, wherein the at least two feeds can be channeled into the pyrolysis unit 201 via conduit 30 either sequentially or simultaneously so as to produce pyrolysis oil 40, and wherein each feed can be varied so as to modulate the properties of the pyrolysis oil so produced; a separation unit 203 for separating the pyrolysis oil into at least two pyrolyzed component fractions 50 according to their boiling range (e.g., Fractions A-C); a hydrotreating unit 207 for hydrotreating at least one of the pyrolyzed component fractions, fed from separation zone 204 (note that the separation zone is separately defined as being the source(s) from which one or more fractions provided for additional processing), so as to yield one or more hydrotreated fractions 60; and an isomerization unit 209 for catalytically-isomerizing at least one of the hydrotreated fractions so as to yield at least one isomerized product 70.

In some such above-mentioned system embodiments, there further comprises a regulating unit 202 for individually controlling the rate at which each teed is fed into the pyrolysis unit. Such a regulating unit enables the ability to produce a uniform product or products when the feed varies (see above). Additionally or alternatively, regulating unit 202 can serve to modulate the properties of the produced pyrolysis oil.

In some such above-mentioned system embodiments, there are at least three feeds in communication with the pyrolysis unit, said feeds comprising (i) a biomass feed, (ii) a waste plastic feed, and (iii) a Fischer-Tropsch waxy feed. Depending on feedstock availability, processing conditions, and desired product(s), one or more of said feeds may cease supplying feedstock to the pyrolysis unit.

Note that in some such above-mentioned system embodiments, the Fischer-Tropsch waxy feed is supplied from an integrated gas-to-liquids (GTL) processing unit. There is, however, generally no proximal requirement for the feedstock source in relation to system 200, such considerations generally being of an economic or logistical nature.

Generally, all of the above-described system units are at least so configured so as to be operable for implementing one or more of the methods described in Section 2.

4. Conclusion

In summary, the present invention is directed generally to methods and systems for producing biofuels via biomass, waste plastic, and/or Fischer-Tropsch product feeds. Such methods and systems provide an improvement over the existing art at least in that they are feed-tolerant (i.e., allow for variability) and provide an economy of scale, while typically retaining the environmental benefits associated with the processing of such feeds.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A system comprising:
   a) a pyrolysis unit;
   b) at least two feeds in communication with said pyrolysis unit, said at least two feeds comprising (i) a biomass feed, and (ii) at least one of a waste plastic feed and a Fischer-Tropsch waxy feed, wherein the at least two feeds are configured to channel the at least two feeds into the pyrolysis unit sequentially or simultaneously so as to produce pyrolysis oil, and wherein the at least two feeds are separated from the pyrolysis unit by a regulatory unit configured to individually control the rate at which each feed is fed into the pyrolysis unit such that each feed is varied so as to produce a uniform product or products from a non-uniform feed;

c) a separation unit for separating the pyrolysis oil into at least two pyrolyzed component fractions according to their boiling range;

d) a hydrotreating unit for hydrotreating at least one of the pyrolyzed component fractions so as to yield one or more hydrotreated fractions; and e) an isomerization unit for catalytically-isomerizing at least one of the hydrotreated fractions so as to yield at least one isomerized product.

2. The system of claim 1, wherein the separation unit utilizes a distillation technique.

3. The system of claim 1, wherein the hydrotreating unit comprises a supported active catalyst component, said component being selected from the group consisting of Co—Mo, Ni—Mo, noble metals, and combinations thereof.

4. The system of claim 1, wherein the isomerization unit comprises a supported noble metal isomerization catalyst.

5. The system of claim 1, wherein there are at least three feeds in communication with the pyrolysis unit, said feeds comprising (i) a biomass feed, (ii) a waste plastic feed, and (iii) a Fischer-Tropsch waxy feed.

6. The system of claim 5, further comprising an integrated gas-to-liquids processing unit in communication with the Fischer-Tropsch waxy feed.

7. The system of claim 1, wherein the regulatory unit is configured to control the rate at which each feed is fed into the pyrolysis unit on-the-fly.

8. A system comprising:

a) a pyrolysis unit;

b) at least three feeds in communication with said pyrolysis unit, said at least three feeds comprising (i) a biomass feed, (ii) a waste plastic feed, and (iii) a Fischer-Tropsch waxy feed, wherein the at least three feeds are configured to channel the at least three feeds into the pyrolysis unit sequentially or simultaneously so as to produce pyrolysis oil, and wherein the at least three feeds are separated from the pyrolysis unit by a regulatory unit configured to individually control the rate at which each feed is fed into the pyrolysis unit;

c) a separation unit for separating the pyrolysis oil into at least two pyrolyzed component fractions according to their boiling range;

d) a hydrotreating unit for hydrotreating at least one of the pyrolyzed component fractions so as to yield one or more hydrotreated fractions; and e) an isomerization unit for catalytically-isomerizing at least one of the hydrotreated fractions so as to yield at least one isomerized product.

* * * * *